Patented Nov. 9, 1937

2,098,503

UNITED STATES PATENT OFFICE 2,098,503

METHOD OF INCORPORATING METALLIC DRIERS IN DRYING OIL ALKYD-NITRO-CELLULOSE BLENDS

William R. Marshall, Upper Darby, Pa., assignor to The Resinous Products & Chemical Company, Philadelphia, Pa.

No Drawing. Application December 22, 1936, Serial No. 117,145

5 Claims. (Cl. 134—26)

This invention relates to a method for preparing a quick-drying lacquer containing relatively large amounts of drying-oil modified alkyd resin and a lesser proportion of cellulose nitrate. It relates more particularly to the method by which a drier such as a soluble cobalt or manganese salt or mixture of the two is incorporated.

Lacquers containing cellulose nitrate and drying-oil alkyd resins have been previously prepared but they have the disadvantage of relatively slow drying. When thoroughly dry, however, they have a high luster and are very durable.

It is an object of this invention to provide a method whereby a coating composition containing cellulose nitrate and a drying-oil alkyd resin can be prepared which combines the quick-drying properties of cellulose nitrate lacquer with the durability and luster of the slow-drying alkyd resin type.

This object is accomplished by preparing a solution of the drying-oil alkyd resin in a suitable solvent, adding thereto a solution of the drier and allowing this mixture to stand at least eight hours before mixing it with the cellulose nitrate solution.

It has been found that by this method of preparation a lacquer can be obtained which will dry dust-free in about fifteen minutes whereas when no drier is added it requires at least 24 hours, and, when the drier is added directly to the solution containing the cellulose nitrate and the drying-oil alkyd, the coating prepared requires about three hours to dry dust-free. The same is true if the drier is added to the alkyd resin solution and this mixed immediately with the cellulose nitrate solution. If a lacquer is made according to the last procedure and allowed to stand, its drying time gradually shortens until at the end of about 30 days it has a drying rate approximately that of the fresh lacquer made according to the present invention.

The drying-oil alkyd resins which are operative in this invention are those which contain the radicals of a polyhydric alcohol such as glycerine, a dibasic acid such as phthalic acid and an acid of a drying oil such as linseed, tung, perilla, etc. The exact method of preparing the resin has no bearing on the present invention which is applicable to all resins of this type, many of which are commercially available.

The driers used may be the cobalt or manganese salts of the fatty acids such as linseed and tung oil acids, or of resin acids such as abietic or of the naphthenic and alkoxy acetic acids. The salts of the alkoxy acetic acids are preferred, especially for clear and light colored enamels, because they have so little effect on the color of the coating. Lead salts have been found to be without effect.

The best results are obtained when a mixture of cobalt and manganese is used, the proportions of which are 0.06% cobalt and 0.03% manganese calculated as metal on the basis of the amount of drying-oil alkyd. Good results are obtained when the amount of cobalt is from about 0.03 to about 0.13% and that of manganese from about 0.005% to about 0.05%. The cobalt and manganese driers can be used alone within about the same range but mixtures of the two give the best results.

In general the method is carried out as follows: A solution of the alkyd resin is made up in a suitable solvent, for example a mixture of toluene and butyl acetate, and to this solution is added the desired amount of drier preferably in the form of a solution. This mixture is then allowed to stand at least eight hours, but preferably twenty-four, before mixing with the desired amount of a cellulose nitrate solution. The lacquers and enamels obtained by this method dry more rapidly than others of similar composition. They also flow out better and have a more lustrous finish.

The following examples will serve to illustrate the invention which, however, is not limited to the exact materials, time proportions, etc. as it may otherwise be practiced within the scope of the appended claims.

Example 1

A solution of alkyd resins of the following composition is prepared. The parts are by weight.

| | |
|---|---|
| Drying oil alkyd resin 80% solution in toluol | 80 parts |
| Butyl acetate | 16 parts |
| Dibutyl phthalate | 4 parts |
| Cobalt drier (calculated as metal on the resin) | 0.06% |
| Manganese drier (calculated as metal on the resin) | 0.03% |

(The driers are the cobalt and manganese salts of mixed naphthenic and alkoxy acetic acids made according to U. S. Patent No. 2,063,838.)

This solution is allowed to stand twenty-four hours and is then mixed with cellulose nitrate solution in the following proportions:

| | Parts |
|---|---|
| 5-6" R. S. cellulose nitrate (dry weight) | 14.25 |
| Solvent (10 toluol, 10 xylol, 40 ethyl acetate, 40 butyl acetate) | 128 |
| Alkyd resin solution as above | 108 |
| Toluidine red pigment | 12.5 |

This gives a coating in which the proportion of alkyd resin to cellulose nitrate is about 5 to 1. When applied by brushing or spraying, this coating dries dust-free in fifteen minutes and hard in six to eight hours.

*Example 2*

The lacquer was made by replacing part of the drying oil alkyd with a non-drying oil alkyd.

| | Parts |
|---|---|
| Drying-oil alkyd solution as in Example 1 | 23 |
| Cellulose nitrate solution | 75 |
| Non-drying oil alkyd resin (solid) | 4.2 |

This lacquer contains 2.5 parts of resin to 1.0 of cellulose nitrate and dries in approximately the same time as the one described in Example 1. Any other resin compatible with the cellulose nitrate, such as those usually employed in the lacquer industry, can be used in conjunction with the drying-oil alkyd resins containing the drier, according to the present invention.

*Example 3*

An alkyd resin solution similar to that shown in Example 1 was made up but contained 0.03% of cobalt and 0.01% of manganese. This was allowed to stand twenty-four hours and was then mixed with the cellulose nitrate solution as shown in Example 1. Coatings prepared from this lacquer dried dust-free in about twenty minutes and hard in seven hours.

The lacquers made according to the present invention have all the quick-drying properties of the usual cellulose nitrate lacquers and in addition the hardness, luster and durability of the alkyd resins. This has never before been possible in lacquers containing both cellulose nitrate and drying-oil alkyd resins for the reason that unless the drier is added in the prescribed manner the coating requires at least three hours for drying dust-free.

I claim:

1. In the process of manufacturing quick-drying lacquers from drying-oil alkyd resins and cellulose nitrate, the steps which comprise adding a metallic drier which is a member of the group consisting of cobalt and manganese driers to a solution of a drying-oil alkyd resin and allowing it to stand at least eight hours before mixing with a cellulose nitrate solution.

2. In the process of manufacturing quick-drying lacquers from drying-oil alkyd resins and cellulose nitrate, the steps which comprise adding a mixture of cobalt and manganese driers to a solution of a drying-oil alkyd resin and allowing it to stand at least eight hours before mixing with a cellulose nitrate solution.

3. In the process of manufacturing quick-drying lacquers from drying-oil alkyd resins and cellulose nitrate, the steps which comprise adding a mixture of cobalt and manganese driers to a solution of a drying-oil alkyd resin and allowing it to stand at least eight hours before mixing with a cellulose nitrate solution, the amount of cobalt being from about 0.03 to about 0.13% and that of the manganese from about 0.005 to about 0.05%, both calculated as percentage of metal on the drying-oil alkyd resin.

4. In the process of manufacturing quick-drying lacquers from drying-oil alkyd resins and cellulose nitrate, the steps which comprise adding from about 0.03 to about 0.13% of cobalt drier, calculated as metal on the drying-oil alkyd resin, to a solution of a drying-oil alkyd resin and allowing it to stand at least eight hours before mixing with a cellulose nitrate solution.

5. In the process of manufacturing quick-drying lacquers from drying-oil alkyd resins and cellulose nitrate, the steps which comprise adding from about 0.005 to about 0.05% of manganese drier, calculated as metal on the drying-oil alkyd resin, to a solution of a drying-oil alkyd resin and allowing it to stand at least eight hours before mixing with a cellulose nitrate solution.

WILLIAM R. MARSHALL.